United States Patent [19]
Honda et al.

[11] Patent Number: 5,066,192
[45] Date of Patent: Nov. 19, 1991

[54] OIL SEALING SYSTEM FOR A TURBO CHARGER

[75] Inventors: Mamoru Honda; Ken Shirato, both of Toyota, Japan

[73] Assignee: Aisin Seiki Kabushiki Kaisha, Kariya, Japan

[21] Appl. No.: 511,210

[22] Filed: Apr. 19, 1990

[30] Foreign Application Priority Data

| Apr. 19, 1989 | [JP] | Japan | 1-46083 |
| Jun. 6, 1989 | [JP] | Japan | 1-66102 |
| Jun. 27, 1989 | [JP] | Japan | 1-75097 |

[51] Int. Cl.$^5$ ............... F01D 11/00; F01D 25/00
[52] U.S. Cl. ............... 415/112; 415/216.1; 415/230; 184/6.11; 184/6.16
[58] Field of Search ............... 415/110, 111, 112, 229, 415/230, 216.1; 277/13, 14 R, 25, 53, 67, 68, 133, 134; 417/407, 408, 409; 184/6.11, 6.16

[56] References Cited

U.S. PATENT DOCUMENTS

| 3,411,706 | 11/1968 | Woollenweber et al. | 417/407 |
| 3,740,170 | 6/1973 | Miller | 417/407 |
| 4,101,241 | 7/1978 | Kasuya | 415/230 |
| 4,235,484 | 11/1980 | Owen et al. | 184/6.11 |
| 4,285,632 | 8/1981 | De Salve | 184/6.11 |
| 4,314,705 | 2/1982 | Shimizu | 277/67 |
| 4,624,629 | 11/1986 | Murayama et al. | 417/407 |

*Primary Examiner*—John T. Kwon
*Assistant Examiner*—Hoang Nguyen
*Attorney, Agent, or Firm*—Banner, Birch, McKie & Beckett

[57] ABSTRACT

An oil sealing system for a turbo charger comprises a housing, a shaft rotatably supported by the housing via a bearing, a turbine-rotor fixed to one end of the shaft, a compressor-rotor fixed to the other end of the shaft, an oil conduit formed in the housing for supplying oil between the shaft and the bearing for lubrication, and an oil sealing device for preventing oil leakage to the turbine-rotor. The oil sealing device comprises, a depression and a drain formed in the housing, a ring-shaped depression and a groove formed on the shaft, and a seal-ring located between the housing and the groove.

5 Claims, 6 Drawing Sheets

OIL SEALING SYSTEM FOR A TURBO CHARGER

FIELD OF THE INVENTION

The present invention relates to an oil sealing system for a turbo charger, and more particularly to an oil sealing system for a turbine side of a turbo charger.

BACKGROUND OF THE INVENTION

A conventional oil sealing system for a turbo charger related to the present invention is disclosed in Japanese Utility model Patent Publication No. 41-1841 published on Feb. 10, 1966, and is shown in FIG. 6. There, a shaft 101 of a turbo charger 100 is rotatably supported in a bearing-housing 102 via bearings 103, 104 and a plate 105. The bearings 103, 104 are lubricated by oil which is supplied through a passage 107. The oil is discharged to an oil-pan (not shown) through a drain-port 113. The plate 105 has a ring-shaped flange portion 105a. A bushing 114 which is located around the shaft 101 has a screw 114a. The rotating direction of the screw 114a is formed against the rotating direction of the shaft 101. Plate 115 is located around the screw 114a.

A compressor-rotor 106 is fixed to an one end of the shaft 101, and a turbine-rotor (not shown) is fixed to the other end of the shaft 101. A rotor-housing 108 is fixed to the bearing-housing 102 by bolts 109, 110. The rotor-housing 108 has an inlet 111 and an outlet 112.

In the above mentioned oil sealing system, the turbine-rotor is supplied exhaust gas, so that the shaft 101 is rotated. Shaft 101, in turn, rotates the compressor-rotor 106. Thus, air in the inlet 111 is sent to the outlet 112.

Oil which lubricates the bearings 103, 104 is drawn toward the outlet 112 by the negative pressure that is generated behind the compressor-rotor 106. The outlet 112 is connected to an intake manifold of an engine (not shown). Thus, it is necessary that the oil leaking is prevented.

In the above mentioned oil sealing system, oil is discharged from the lubricated components, for removal through outlet 113, by the rotation of the ring-shaped flange portion 105a. Oil is directed to the plate 105 by the screw 114a and the plate 115. Therefore, the oil leakage is prevented.

However, this oil sealing system is complicated in construction. Manufacturing of the system requires many steps and involves relatively high costs.

SUMMARY OF THE INVENTION

Accordingly, it is a primary object of the present invention to prevent lubricating oil from leaking in a turbo charger.

The above and other objects are achieved according to the present invention by an oil sealing system for a turbo charger that comprises a housing, a shaft rotatably supported by the housing via a bearing, a turbine-rotor fixed to one end of the shaft, a compressor-rotor fixed to the other end of the shaft, an oil conduit formed in the housing for supplying oil between the shaft and the bearing for lubrication, and an oil sealing device for preventing oil leakage to the turbine-rotor. The oil sealing means comprises a depression and a drain formed in the housing, a ring-shaped depression and a groove formed on the shaft, and a seal-ring located between the housing and the groove.

BRIEF DESCRIPTION OF THE DRAWINGS

A more complete appreciation of the invention and many of the attendant advantages thereof will be readily obtained and better understood by reference to the following detailed description when considered in connection with the accompanying drawings, wherein.

DETAILED DESCRIPTION

Figure 1:
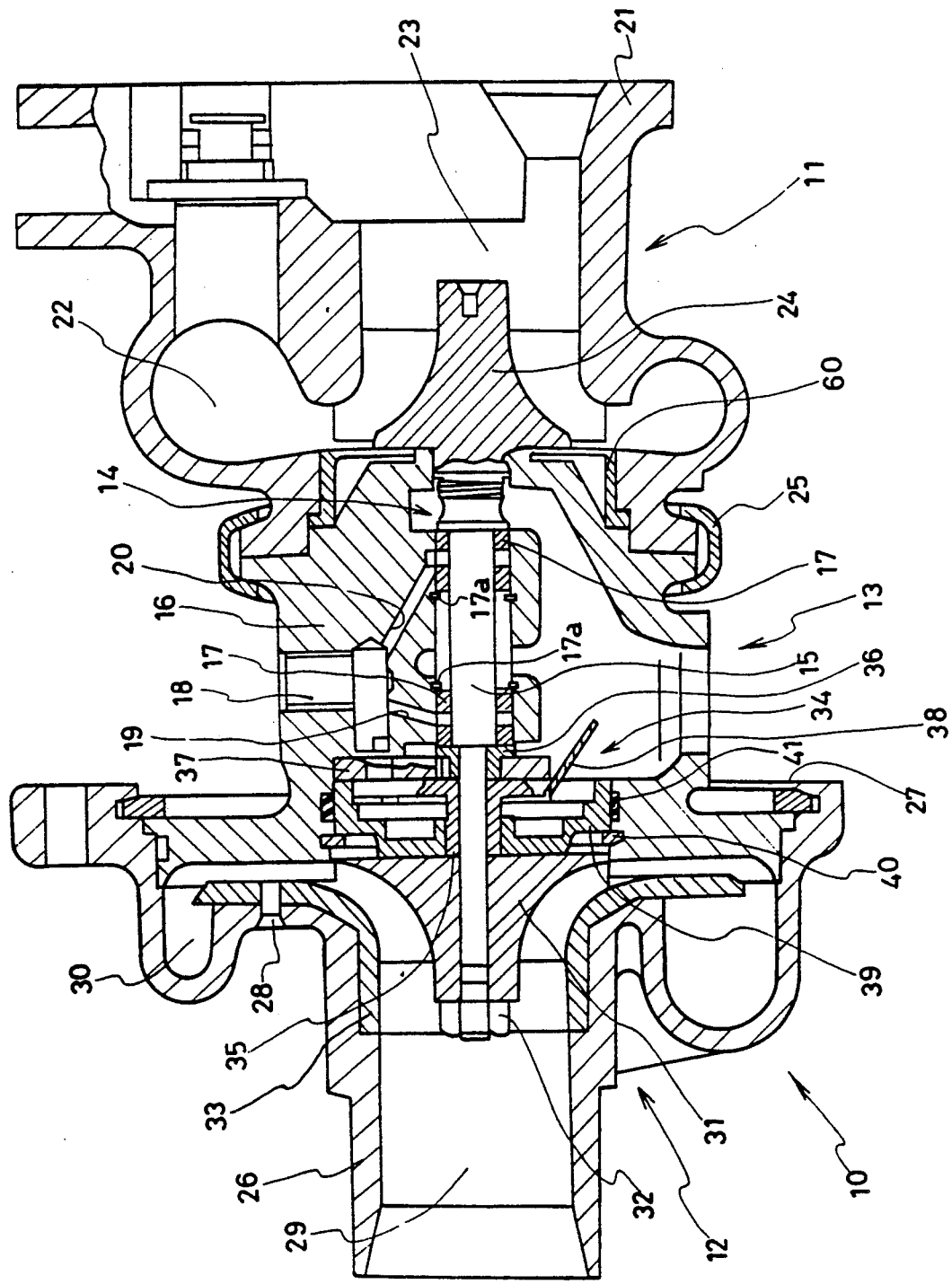
FIG. 1 is a cross-sectional view of an oil sealing system for a turbo charger according to the invention.

Referring first to one embodiment of the present invention shown in FIG. 1, a turbo charger 10 for an engine (not shown) includes a turbine means 11, a compressor means 12, a bearing means 13 and an oil sealing means 14.

In the bearing means 13, a shaft 15 is rotatably supported by a bearing-housing 16 via radial bearings 17, 17 which are held by snap-rings 17a, 17a. The bearing-housing 16 has oil conduits 18, 19, 20 which supply oil to the radial bearings 17, 17 for lubricating between the shaft 15 and the radial bearings 17, 17.

A turbine-housing 21 is fixed to one end of the bearing-housing 16 by a fastener 25. A heat-insulator 60 is provided between the turbine-housing 21 and the bearing-housing 16. The turbine-housing 21 includes an exhaust-inlet 22 and an exhaust-outlet 23. A turbine-rotor 24 is fixed to one end of the shaft 15.

A compressor-housing 26 is fixed to the other end of the bearing-housing 16 by a snap-ring 27. The compressor-housing includes an intake-inlet 29 and an intake-outlet 30. A diffuser 33 is fixed to the compressor-housing 26 by a bolt 28. A compressor-rotor 31 is fixed to the other end of the shaft 15 by a nut 32.

An oil sealing means for compressor-side 34 is provided between the left end of the radial bearings 17, 17 and the right end of the compressor-housing 26. Thrust bushings 35, 36 are located around the shaft 15. The thrust bushing 36 is supported by a thrust bearing 37 which is lubricated by oil supplied from the oil conduit 18. An outer circumferential portion of a sealing plate 38 is fixed to a sealing plate 39. The thrust bearing 37 and the sealing plate 39 are fixed to the bearing-housing 16 by a snap-ring 40. A seal-ring 41 is located between the outer circumferential portion of the sealing plate 39 and the bearing-housing 16. A slight clearance is located between the outer circumferential portion of the thrust bushing 35 and the inner circumferential portion of the sealing plate 38, and between the outer circumferential portion of the thrust bushing 35 and the inner circumferential portion of the sealing plate 39. A labyrinth sealing effect is caused by bushing 35 and sealing plate 38 and the slight clearance therebetween. A seal-ring (not shown) is located between bushing 35 and sealing plate 39.

In the oil sealing means 14, a depression 42 and a drain 43 are formed in the bearing-housing 16. A seal-ring 44 is located between a groove 46 formed on the shaft 15 and the bearing-housing 16. A screw 45 is formed on the outer circumferential portion of the shaft 15 between the groove 46 and a ring-shaped depression 47. The rotating direction of the screw 45 is formed against the rotating direction of the shaft 15.

The operation according to the embodiment is described hereinafter.

When the engine starts, the exhaust gas of the engine rotates the turbine-rotor 24 at a high rate of revolution, so that the compressor rotor 31 is rotated together with the shaft 15. Thus, the intake-air is discharged to the engine.

Figure 2:
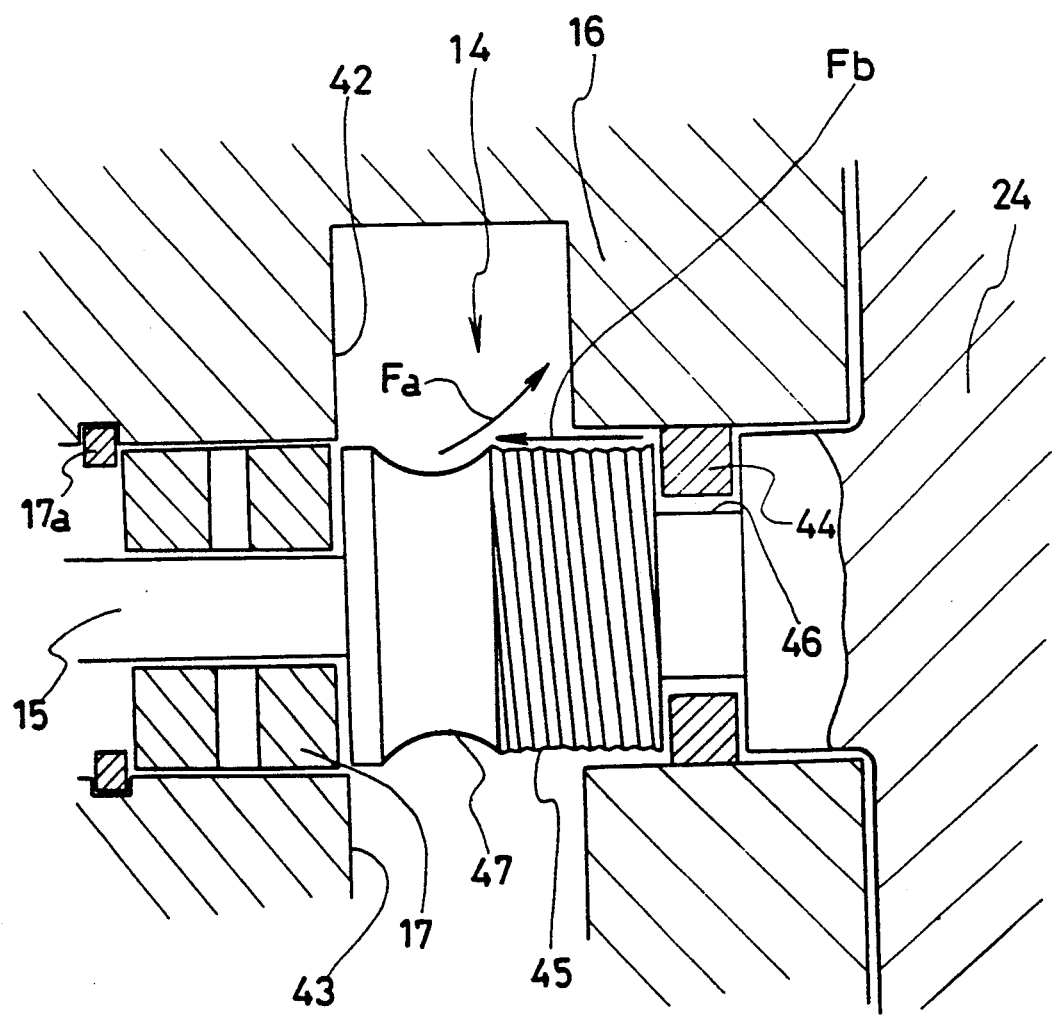
FIG. 2 is an enlarged cross-sectional view around an oil sealing means in FIG. 1, with an oil conduit omitted.

An oil pump (not shown) of the engine pumps or supplies oil to the radial bearings 17,17 via the oil conduits 18,19,20. In the oil sealing means 14, oil is drawn toward the opposite side of the turbine-rotor 24 by the negative pressure that is generated behind the turbine-rotor 24 due to its rotation. However, oil is returned to the ring-shaped depression 47 by the screw 45, in the direction Fb, as shown in FIG. 20. The oil is then discharged by the rotative action of the ring shaped depression 47, in the direction of Fa, as shown in FIG. 2. Therefore, oil is discharged to an oil-pan (not shown) of the engine through the drain 43, and is not leaked behind the turbine-rotor 24.

The above described embodiment has many advantages. Oil leakage behind the turbine-rotor 24 is prevented, so that oil is not mixed with the exhaust gas. Therefore, oil consumption is decreased, and white smoke is not generated by mixed oil with the exhaust gas.

Figure 3:
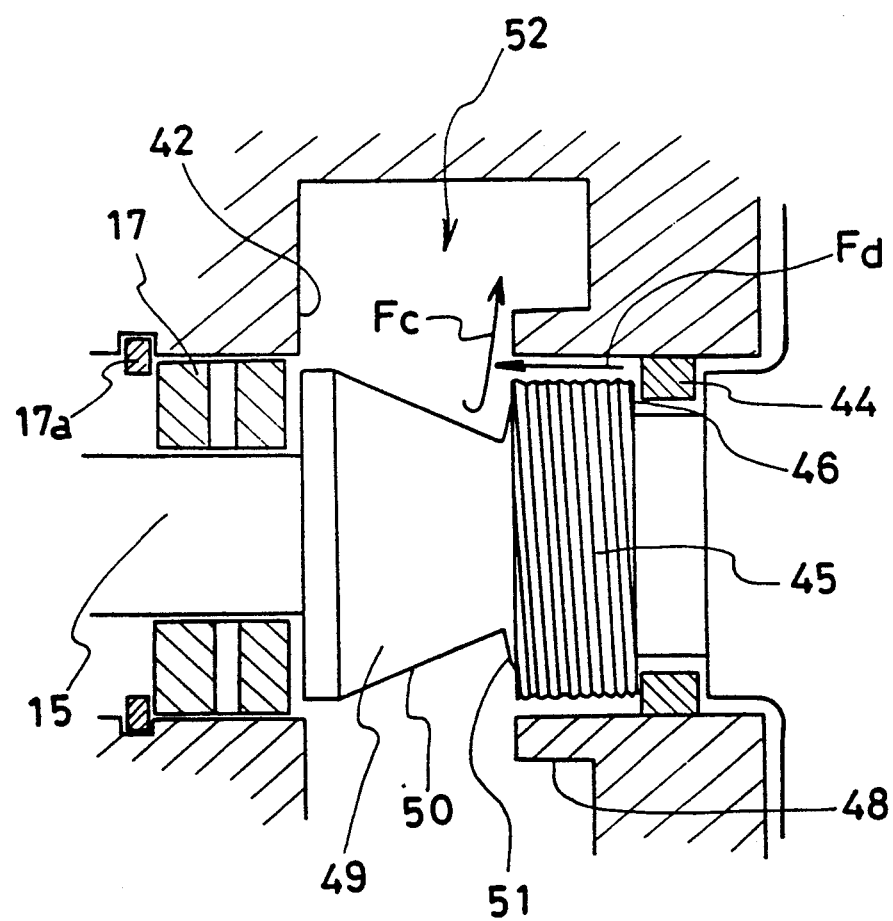
FIG. 3 is a view similar to FIG. 2, for showing a second embodiment thereof.

Next, FIG. 3 shows a second embodiment of an oil sealing system for a turbo charger. The second embodiment is similar to the first embodiment shown in FIGS. 1 and 2. Hence only the differences in construction from the first embodiment will be described hereinafter.

On the depression 42 of an oil sealing means 52, a ring-shaped flange portion 48 is formed around the screw 45. A ring-shaped depression 49 is formed on the shaft 15. Depression 49 has a taper portion 50 and a vertical portion 51.

The operation according to the second embodiment is essentially the same as in the first embodiment (FIG. 1). Hence only the differences in operation from the first embodiment shown in FIGS. 1 and 2 will be described hereinafter.

In the oil sealing means 52, oil is returned to the ring-shaped depression 49 by the screw 45, in the direction Fd, as shown in FIG. 3, and is discharged by the rotative action of the ring-shaped depression 49, in the direction Fc, as shown in FIG. 3. Thereafter, the oil flows around on the outer circumferential portion of the ring-shaped flange portion 48, and is discharged to the oil-pan (not shown) of the engine via the drain 43. Oil leakage behind the turbine-rotor 24 is therefore prevented.

The many advantages of the first embodiment are also realized in the second embodiment.

Figure 4:
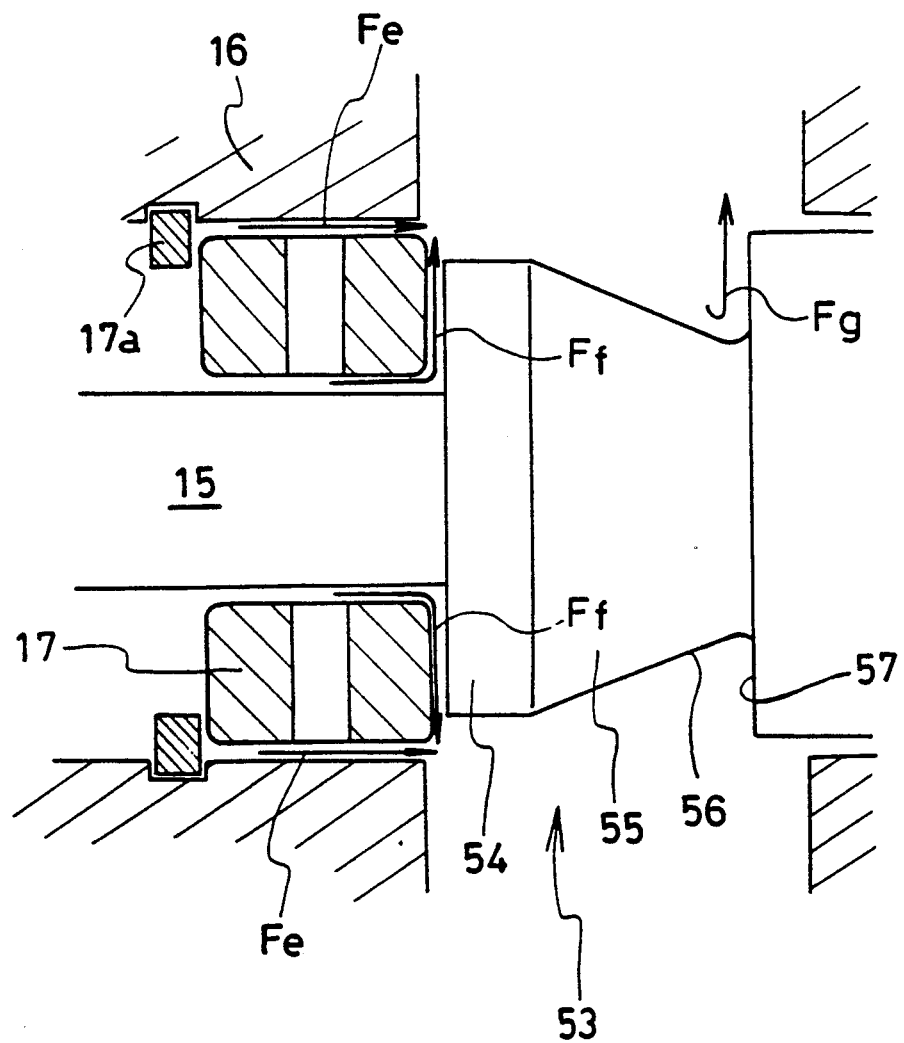
FIG. 4 is a view similar to FIG. 2, for showing a third embodiment thereof.

Next, FIG. 4 shows a third embodiment of an oil sealing system for a turbo charger. The third embodiment is similar to the embodiment shown in FIGS. 1 and 2. Hence, only the differences in construction from the first embodiment will be described hereinafter.

In an oil sealing means 53, a portion 54 is formed on the shaft 15. The outside diameter of the portion 54 is smaller than the outside diameter of the radial bearing 17, but larger than the inside diameter of the radial bearing 17. A ring-shaped depression 55 is formed on the shaft 15. Depression 55 has a taper portion 56 and a vertical portion 57.

The operation according to the third embodiment is essentially the same as in the first embodiment (FIG. 1). Hence, only the differences in operation from the first embodiment shown in FIGS. 1, 2 will be described hereinafter.

In the oil sealing means 53, oil which lubricates the radial bearing 17 flows in the directions Fe, Ff, as shown in FIG. 4. Thus, the flowing force of the Fe flow of oil and the flowing force of the Ff flow of oil are negated by each other, so that the oil flows to the drain 43. Oil which accumulates on the ring-shaped depression 55 is discharged by the rotative action of the ring-shaped depression 55, in the direction Fg, as shown in FIG. 4, and is discharged to the oil-pan (not shown) of the engine via the drain 43. Oil leakage behind the turbine-rotor 24 is therefore prevented.

The many advantages of the first embodiment also realized by the third embodiment.

Figure 5:
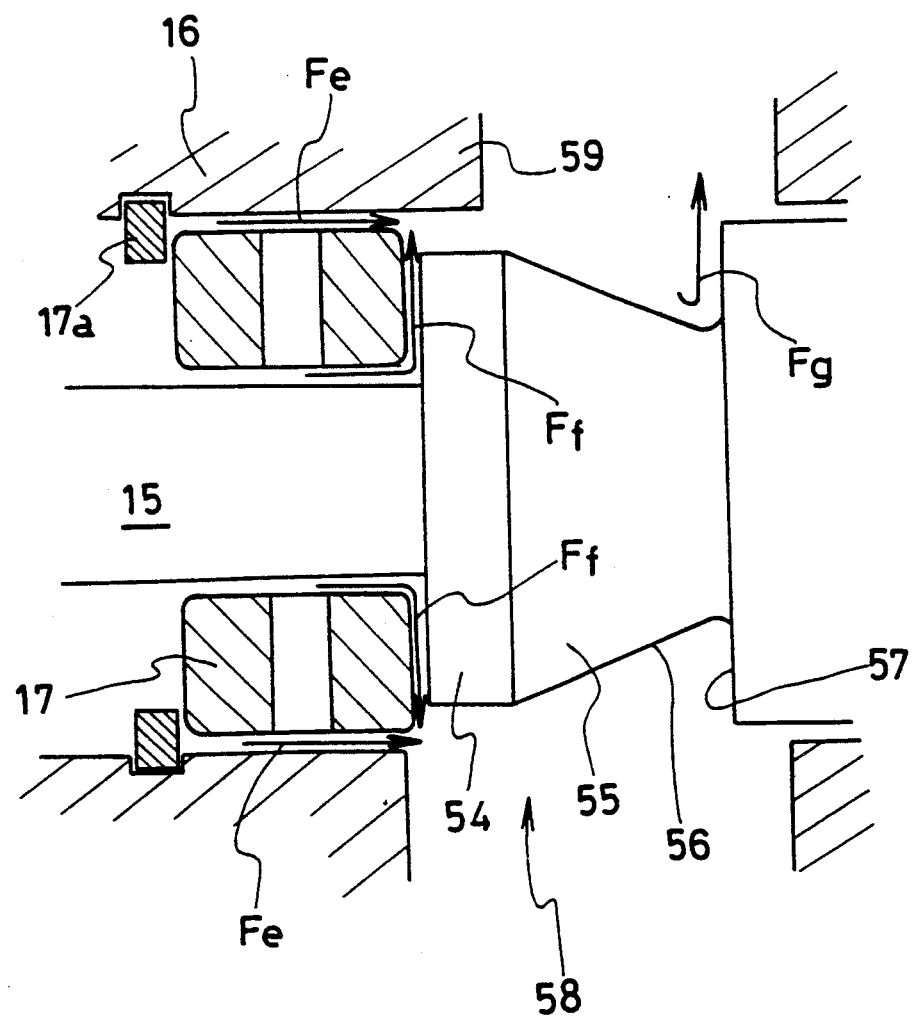
FIG. 5 is a view similar to FIG. 2, for showing a fourth embodiment thereof.
Figure 6:
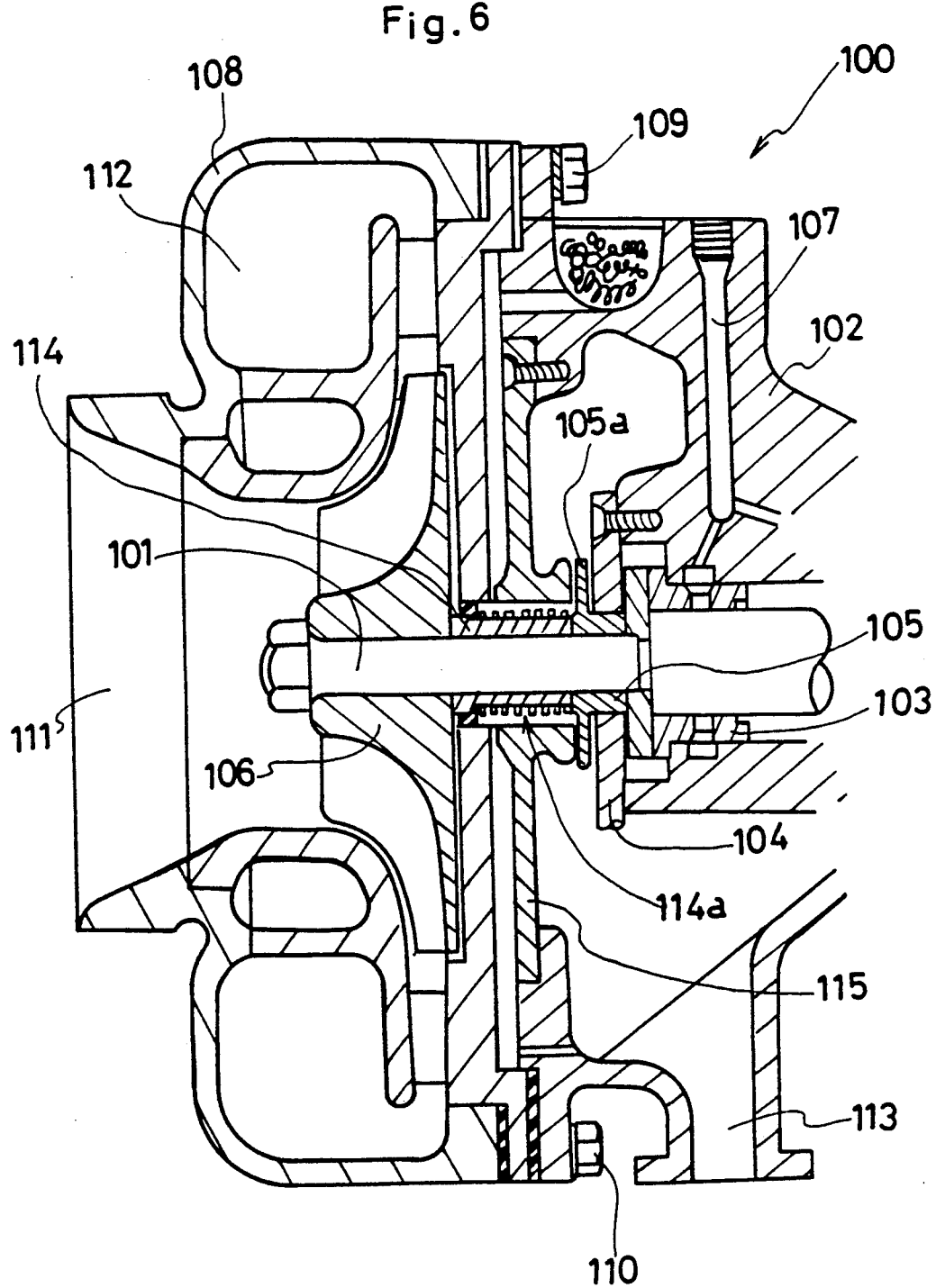
FIG. 6 is a cross-sectional view of a conventional oil sealing system for a turbo charger.

Next, FIG. 5 shows a fourth embodiment of an oil sealing system for a turbo charger. The fourth embodiment is similar to the third embodiment shown in FIG. 4. Hence, only the differences in construction from the third embodiment will be described hereinafter.

In an oil sealing means 58, an extended portion 59 is formed on the bearing-housing 16 around the portion 54. A lower open end (not shown) of the extended portion 59 is located near the lower end of the radial bearing 17.

The operation of the fourth embodiment is essentially the same as the third embodiment shown in FIG. 4. Hence, only the differences in operation from the third embodiment shown in FIG. 4 will be described hereinafter.

In the oil sealing means 58, oil flows in the directions Fe, Ff, as shown in FIG. 5. The flowing force of the Fe flow of oil and the flowing force of the Ff flow of oil are negated by each other, so that the oil accumulates on extended portion 59. Thereafter, the oil flows around on the inner circumferential portion of the extended portion 59 and to the drain.

The many advantages of the first embodiment are also realized in the fourth embodiment.

Obviously, numerous modifications and variations of the present invention are possible in light of the above teachings. It is therefore to be understood that within the scope of the appended claims, the invention may be practiced otherwise than as specifically described herein.

We claim:

1. An oil sealing system for a turbo charger comprising:
   a housing;
   a shaft rotatably supported by the housing via a bearing;
   a turbine-rotor fixed to one end of the shaft;
   a compressor-rotor fixed to the other end of the shaft;
   an oil conduit formed in the housing for supplying oil between the shaft and the bearing for lubrication; and
   an oil sealing means for preventing oil leakage to the turbine-rotor;
   the oil sealing means including:
      a depression formed in the housing;
      a drain formed in the housing;

a ring-shaped depression formed on the shaft, wherein the ring-shaped depression has a taper portion and a vertical portion;

a groove formed on the shaft;

a seal-ring located between the housing and the groove; and a directing means for directing oil away from said turbine-rotor, wherein said directing means comprises a screw formed on the outer circumferential portion of the shaft between the groove and the ring-shaped depression;

wherein the bearing defines an outside diameter and an inside diameter, and wherein a portion defining an outside diameter is formed on the shaft, such that the outside diameter of the portion is smaller than the outside diameter of the bearing and larger than the inside diameter of the bearing.

2. An oil sealing system for a turbo charger as set forth in claim 1, wherein a ring-shaped flange portion is formed around the screw on the depression.

3. An oil sealing system for a turbo charger as set forth in claim 1, wherein an extended portion is formed on the housing around the portion.

4. The oil sealing system for a turbo charger as set forth in claim 1, wherein said portion defining an outside diameter on the shaft comprises a stepped portion having a substantially vertical side adjacent said bearing and a substantially cylindrical surface which defines said outside diameter extending from the vertical side;

said ring-shaped depression being formed on said stepped portion with said taper portion extending from said cylindrical portion and said vertical portion extending to a second substantially cylindrical portion, said screw being formed on said second substantially cylindrical portion; and said depression in the housing spanning from said vertical side of said stepped portion to said screw, and a portion of said housing surrounding said screw such that oil between said screw and said portion of said housing will be pushed by said screw towards said ring-shaped depression and said depression in said housing.

5. An oil sealing system for a rotor shaft comprising:

a housing;

a shaft rotatably supported by the housing via a bearing having an inner and an outer diameter;

a rotor fixed to one end of the shaft;

an oil conduit formed in the housing for supplying oil between the shaft and the bearing for lubrication; and an oil sealing means for preventing oil leakage to the rotor;

the oil sealing means including:

a drain formed in the housing;

a depression formed in the housing directing oil collected thereon to said drain;

a ring shaped depression formed on the shaft for flinging the oil into the depression formed in the housing;

a groove formed on the shaft between said rotor and said ring shaped depression;

a seal-ring located in said groove between the housing and said shaft;

a stepped portion on said shaft immediately adjacent said bearing, said stepped portion having an outside diameter which is larger than the inner diameter of said bearing but smaller than the outer diameter of the bearing so that the flow of oil over the outer diameter of the bearing and the flow of oil between the bearing and the stepped portion of the shaft substantially negate each other to increase the effectiveness of directing the oil to the drain; and a means located between said bearing and said rotor for directing oil away from said rotor, said means comprising a screw formed on an outer circumferential portion of said shaft between said rotor and said ring shaped depression, said screw being constructed and operating such that the oil will be directed towards said ring shaped depression and away from said rotor to alleviate the risk of oil seepage behind the rotor.

* * * * *